(12) United States Patent
Chuang

(10) Patent No.: US 11,165,929 B2
(45) Date of Patent: Nov. 2, 2021

(54) ENCRYPTED GALLERY MANAGEMENT SYSTEM AND IMPLEMENTATION METHOD THEREOF

(71) Applicant: Lien Hao Chuang, Kaohsiung (TW)

(72) Inventor: Lien Hao Chuang, Kaohsiung (TW)

( * ) Notice: Subject to any disclaimer, the term of this patent is extended or adjusted under 35 U.S.C. 154(b) by 366 days.

(21) Appl. No.: 16/263,695

(22) Filed: Jan. 31, 2019

(65) Prior Publication Data

US 2020/0021714 A1 Jan. 16, 2020

(30) Foreign Application Priority Data

Jul. 13, 2018 (TW) .................................. 107124362

(51) Int. Cl.
*H04L 29/06* (2006.01)
*H04N 1/44* (2006.01)
*G06F 16/182* (2019.01)
*H04L 9/08* (2006.01)
*H04L 9/32* (2006.01)

(52) U.S. Cl.
CPC ......... *H04N 1/444* (2013.01); *G06F 16/1824* (2019.01); *H04L 9/0816* (2013.01); *H04L 9/32* (2013.01); *H04N 1/4486* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 2008/0101604 A1* | 5/2008 | Kocher | .................. | G06F 21/50 380/210 |
| 2011/0055585 A1* | 3/2011 | Lee | ........................ | H04L 9/0844 713/183 |
| 2013/0273968 A1* | 10/2013 | Rhoads | .................. | H04W 4/50 455/556.1 |

(Continued)

OTHER PUBLICATIONS

Cao, Yuan et al. Using image sensor PUF as root of trust for birthmarking of perceptual image hash. 2016 IEEE Asian Hardware-Oriented Security and Trust (AsianHOST). https://ieeexplore.ieee.org/stamp/stamp.jsp?tp=&arnumber=7835573 (Year: 2016).*

(Continued)

*Primary Examiner* — Jeremiah L Avery
(74) *Attorney, Agent, or Firm* — Muncy, Geissler, Olds & Lowe, P.C.

(57) ABSTRACT

An encrypted gallery management system and an implementation method thereof, comprising a management server and at least one information device, wherein the system converts one or more sets of corresponding time digital information into a time digital information totem and an encryption key totem, the time digital information totem and the encryption key totem are synthesized into an encrypted image. After user scans the encrypted image with his information device to obtain the totems, the information device can upload the totems to the management server for verification and comparison so that the management server is enabled to respond a specific service information to the information device so as to restrict the access of the information and thus prevent other unauthorized persons from obtaining the service information.

10 Claims, 10 Drawing Sheets

(56) References Cited

U.S. PATENT DOCUMENTS

2018/0041338 A1* 2/2018 Nighswander ...... G06F 21/6209

OTHER PUBLICATIONS

Nassar, Nader; Chen, Li-Chiou. Image-Based Seed Generation. 2016 IEEE 2nd International Conference on Collaboration and Internet Computing (CIC). https://ieeexplore.ieee.org/stamp/stamp.jsp?tp=&arnumber=7809735 (Year: 2016).*

* cited by examiner

ENCRYPTED GALLERY MANAGEMENT SYSTEM AND IMPLEMENTATION METHOD THEREOF

BACKGROUND OF PRESENT DISCLOSURE (1) Field of the Invention

The present disclosure relates to an encrypted gallery management system, more particularly to an encrypted gallery management system capable of generating and managing restricted information access function and implementation method thereof.

(2) Brief Description of Related Art

Currently, 2D barcodes have been widely used in commercial implementations, and 2D barcodes are scanned through electronic devices to obtain relevant information. Furthermore, there are various types of 2D barcodes, such as PDF417 code, Quick Response code (QR code), Hanxin code, color bar code, EZ code, Aztec code, QuickMark, Data Matrix, etc., wherein QR code is the most popular one and it has the advantage that users need not to point at the QR code and the data can be read correctly regardless of scanning at any angle.

However, any text or digital information stored in QR code can be easily scanned and retrieved by any information device. For example, confidential internal documents of a corporation must be set with review rights according to hierarchy level of staff. If each level of staff can scan to get confidential information, effective information protection management cannot be achieved. Therefore, in special occasions, it is not possible to achieve the management of restricting information access, and the accuracy of acquiring information may vary depending on the optical conditions of device and the APP program.

In addition, conventional barcode with data is presented in the form of a matrix image or a chip card on an entity, so that user cannot directly identify its purpose or meaning, thus it is necessary to add the meaning or link represented by it to its periphery, so there are still many inconveniences in use, and if there is a need for collocation of image layout, it often cause the happening of overall image uncoordinated situation.

In summary, there is still a lot of room for improvement in current method of scanning bar code to capture pre-written information.

SUMMARY OF PRESENT DISCLOSURE

Therefore, the object of the present disclosure is to provide an encrypted gallery management system capable of managing restricted information access and the implementation method thereof.

In order to achieve above object, the encrypted gallery management system of the present disclosure comprises a management server and at least one information device. The present disclosure generates, through the management server, one or more groups of corresponding time digital information which can be converted into a time digital information totem after execution of a program.

The management server further configures an encryption key totem, and the management server can further synthetize the time digital information totem and the encryption key totem into an encrypted image.

After user scans the encrypted image having time digital totem and encryption key totem carried thereon by the information device, the management server can respond a specific service information to the information device, thereby the purpose of information restriction access can be achieved.

That is, users of other non-encrypted library management systems cannot obtain service information even if they scan encrypted images with their devices.

Moreover, the encrypted image of the present disclosure is not limited by the two-dimensional bar code or the QR-code and the like, and the dedicated APP program used by the device is compatible to retrieve two-dimensional bar code or the QR-code bar code, but the APP program which generally can only scan two-dimensional barcode or QR-code is unable to retrieve time digital signal of the encrypted image provided in the present disclosure for decoding.

Therefore, the present disclosure can achieve a verification mechanism with uniqueness, safety, precision and rapidity, and simultaneously achieve the purpose of environmental protection and friendly environment.

DETAILED DESCRIPTION OF PREFERRED EMBODIMENTS

Figure 1:
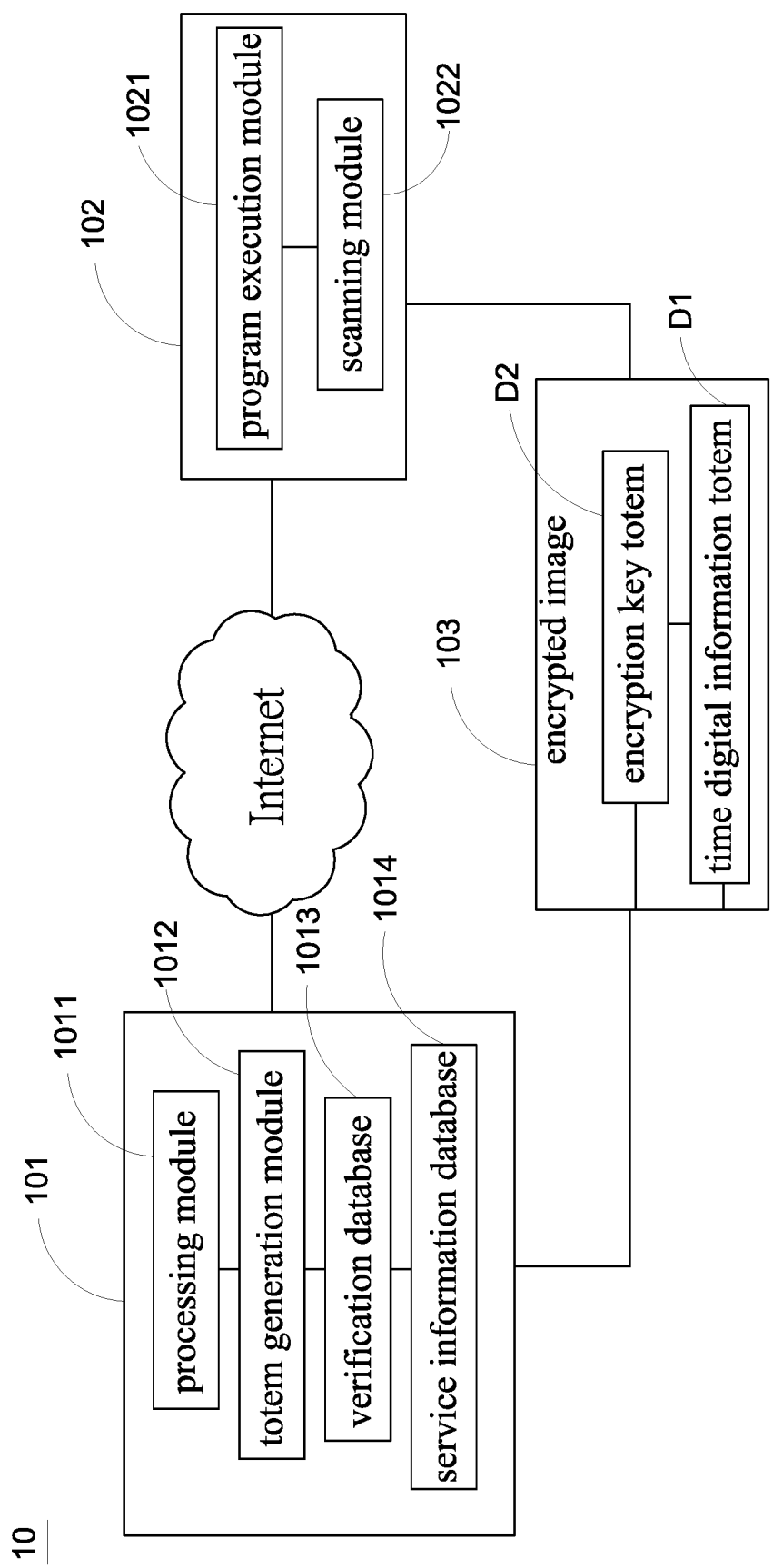
FIG. 1 is a schematic view of the system configuration of the present disclosure.

Referring to FIG. 1, the encrypted gallery management system 10 of the present disclosure comprises a management server 101 and at least one information device 102. The management server 101 has at least one processing module 1011, a totem generation module 1012, a verification database 1013 and a service information database 1014. The processing module 1011 is connected to the totem generation module 1012, the verification database 1013 and service information database 1014.

The processing module 1011 is configured to operate the management server 101, and the processing module 1011 can conduct image synthesis of a time digital information totem D1, an encryption key totem D2 with an original image to generate an encrypted image 103. The processing module 1011 can write, in concealing style, the time digital totem D1 and the encryption key totem D2 into the original image for detection through, for example, a quantization index value modulation method (QIM), a vector quantization coding method (VQ), an index value residual quantization (QIMM), and one steganography algorithms of the least significant bit coding (LSB).

The totem generation module 1012 is configured to convert a time digital information into a data structure of a time digital information totem D1, wherein the data type of the time digital information may be one of an image bit data (e.g. a digital image, a picture, or a totem), an integer, a floating point number, and a character (e.g., a text) or a combination thereof.

The verification database 1013 is configured to store the time digital totem D1 and the encryption key totem D2. Further, the verification database 1013 can be applied to a blockchain network which can ensure to prevent arbitrarily tampering of the time digital information totem D1 or the encryption key totem D2.

The service information database 1014 is configured to store at least one service information, which can be executed by the information device 102, and can be directly linked to perform, for example, other multimedia text, video, video playback, start a device switch, store shopping and payment, turn on or off equipment. The service information can be, for example, "parking management", "electrical appliance startup control", "remote device startup control", "food and beverage order payment invoice voucher management", "retail trade management", "digital coupon", "access control verification information", "digital authentication information", "linked website" and "digital advertising information", however, any type of electronic information can be implemented without limitation.

The information device 102 can be a computer device that can run an application. The information device 102 further includes at least a program execution module 1021 and a scanning module 1022.

The program execution module 1021 is configured to operate the information device 102 so as to analyze the encrypted image 103 and to capture the time digital totem D1 and the encryption key totem D2 from the encrypted image 103. The program execution module 1021 can detect the time digital information totem D1 and the encryption key totem D2 of the original picture through a steganographic algorithm such as index value remainder quantization (QIMM).

The scanning module 1022 is connected to the program execution module 1021 for capturing the image of the encrypted image 103.

Figure 2:
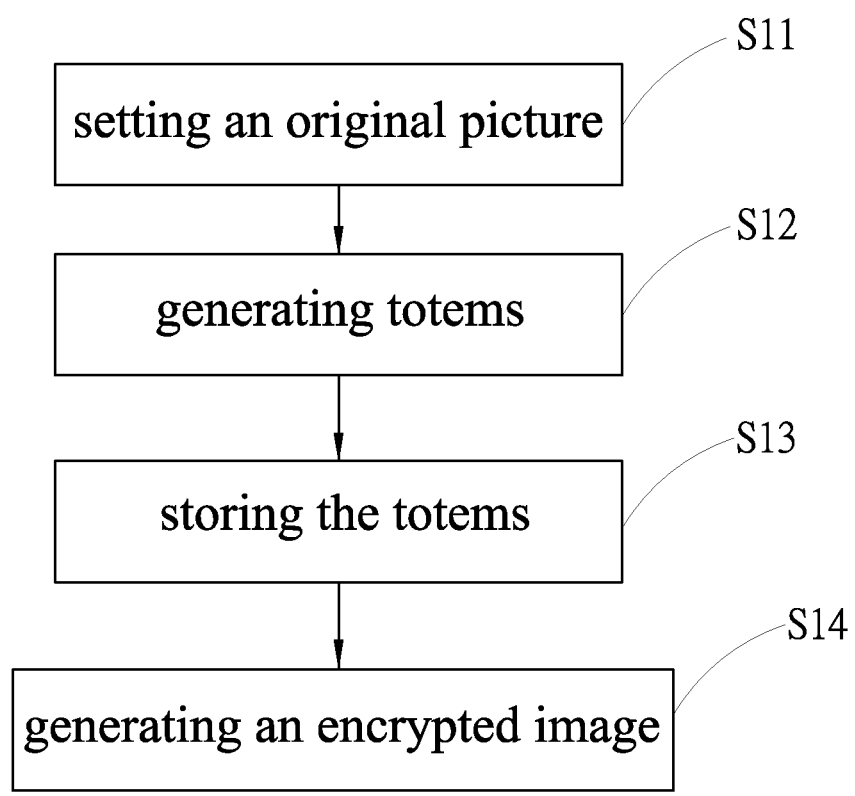
FIG. 2 is a flow chart of generating encryption image of the present disclosure.
Figure 3:
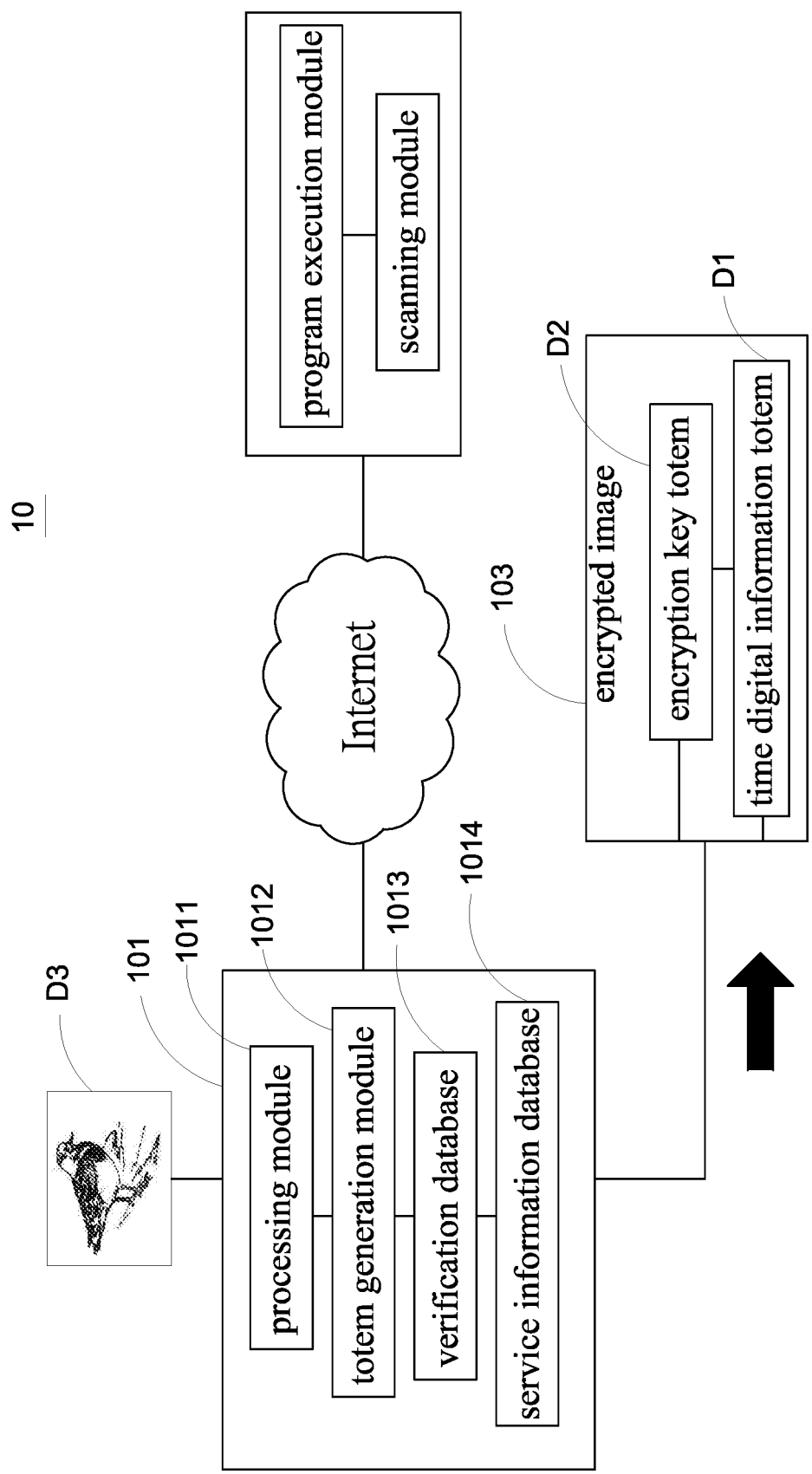
FIG. 3 is a schematic view (1) of the implementation of the present disclosure.

Referring to FIG. 2 and FIG. 3, the method S1 for generating an encrypted image of the present disclosure is as follows:

(1) setting an original picture S11: as shown in FIG. 3, after selecting an original picture D3 and setting a service information, the original picture D3 and the service information are transmitted to the management server 101;

(2) generating totems S12: after the management server 101 receives the original image D3 and the service information, the processing module 1011 generates a time digital information and an encryption key according to an encoding rule. After the time digital information is imaged through the totem generation module 1012, a time digital information totem D1 and an encryption key totem D2 are generated. The time digital information may be a digital time stamp when processing the encoding, but is not limited thereto;

(3) storing the totems S13: After the processing module 1011 generates the time digital information totem D1 and the encryption key totem D2, the processing module 1011 further transmits the time digital information totem D1 and the encryption key totem D2 to the verification database 1013 for storage thereto;

(4) generating an encrypted image S14: the processing module 1011 conducts image synthesis on the time digital information totem D1, the encrypted key totem D2 and the original image D3, and performs image synthesis by applying a steganographic algorithm so that the time digital information totem D1 and encrypted key totem D2 is synthesized in the image pixels of the original picture D3, and an encrypted image 103 is thus generated upon completion of the image synthesis.

Continuing the step of setting the original image S11 shown in FIG. 2, the original image D3 can be selected by operating the management server 101 at the management terminal. For example, if a management terminal wants to hold an event, the management terminal can load the activity related image into the management server 101, and then the method of generating the encrypted image S1 is performed. Alternatively, the original image D3 can also be set by user, and user can select an image through the information device 102 and transfer the image to the management server 101, and then the encrypted image generation method S1 is performed. Thereby, individual user of the management terminal or the terminal can set the encrypted image 103 with unique identification.

Figure 4:
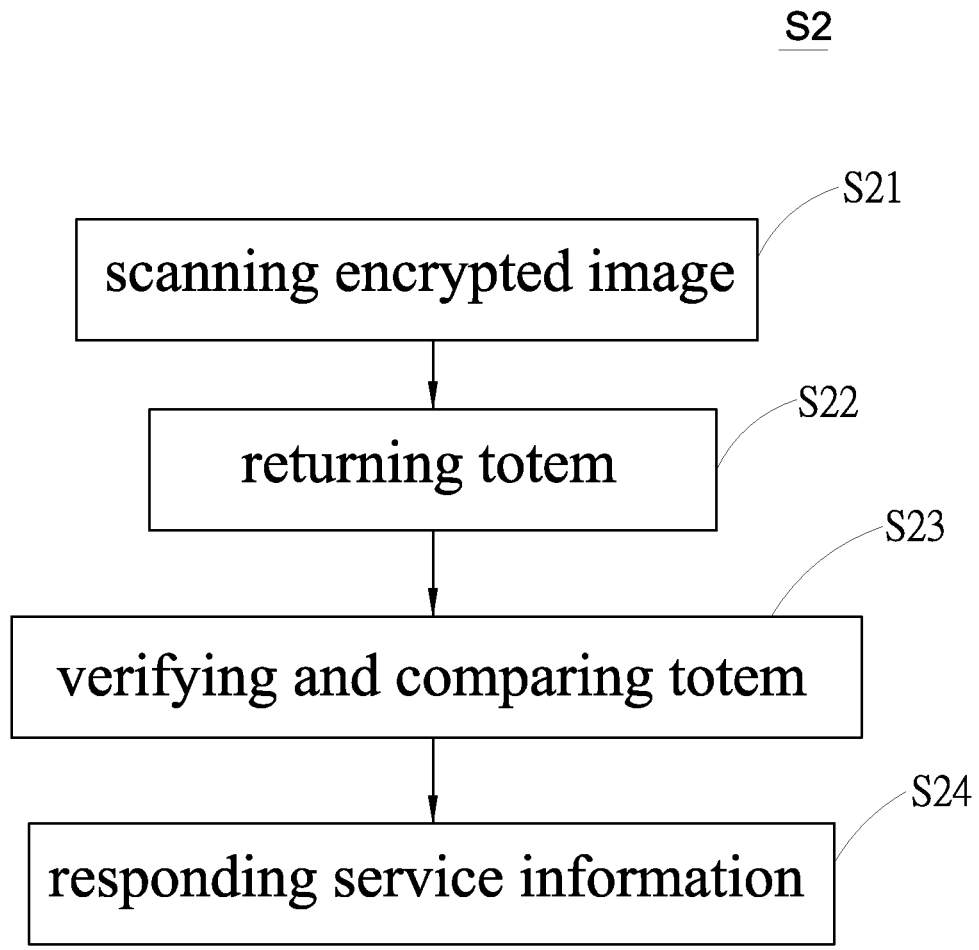
FIG. 4 is a flow chart of the implementation of the present disclosure.
Figure 5:
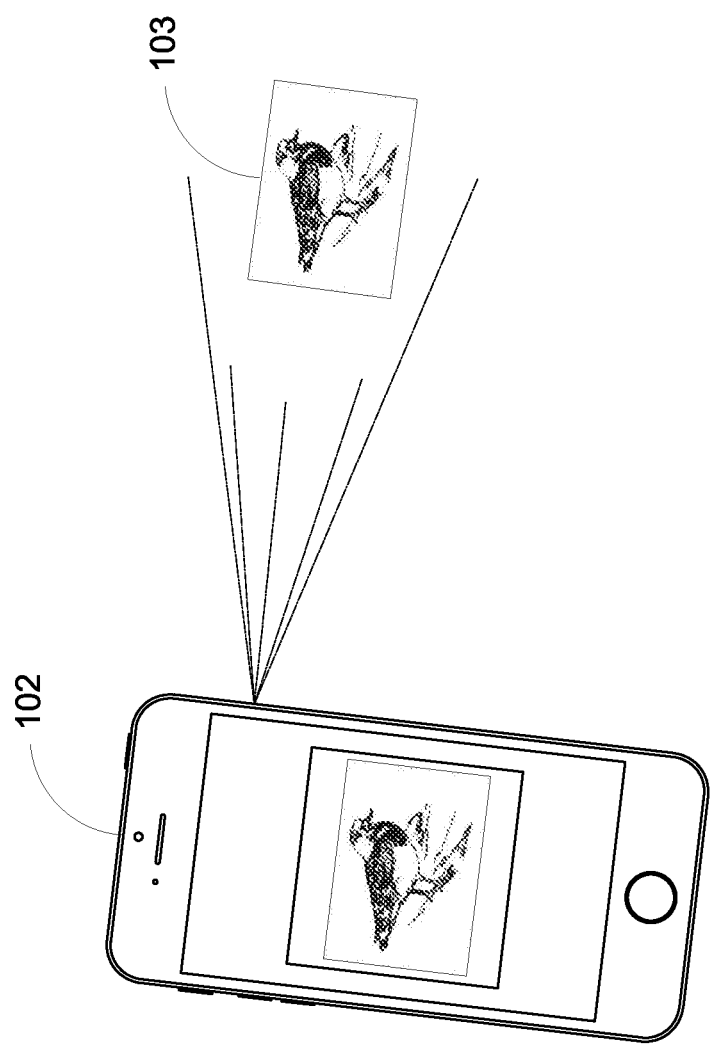
FIG. 5 is a schematic view (2) of the implementation of the present disclosure.
Figure 6:
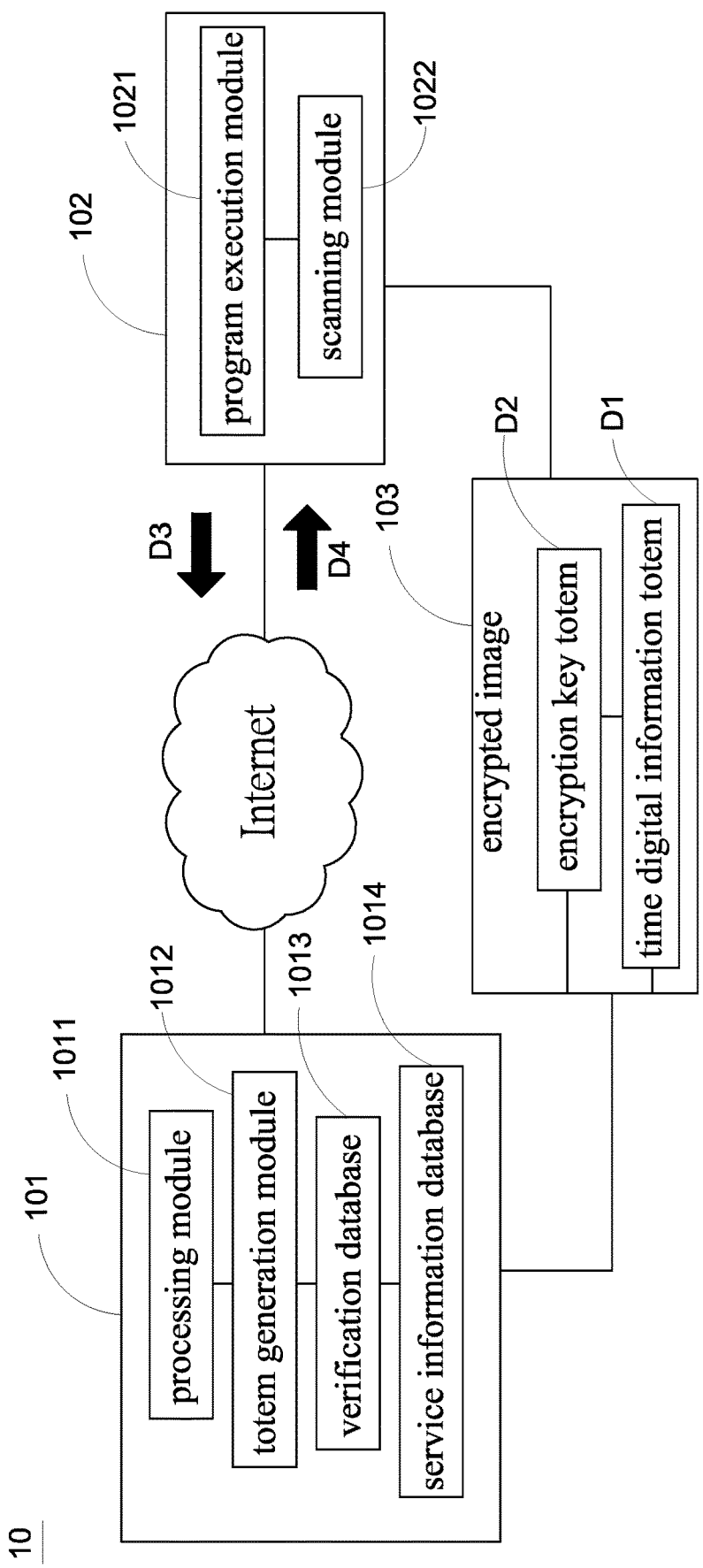
FIG. 6 is a schematic view (3) of the implementation of the present disclosure.

Referring to FIG. 4, FIG. 5, FIG. 6, the implementation method S2 of the encrypted gallery management system of the present disclosure is as follows:

(1) Scanning encrypted image S21: After the information module 102 scans an encrypted image 103 with the scanning module 1022 thereof, a program execution module 1021 of the information device 102 analyzes the acquired encrypted image 103 to obtain a time digital information totem D1 and an encryption key totem D2 by applying a steganographic decoding algorithm; when the information device 102 analyzes the encrypted image 103, a decoding process may be performed on the encrypted image 103, and the decoding program may be defined as:

(A) the encrypted image 103 and the original image D3 (the original image D3 may be stored in the management server 101 or the information device 102) performs a comparison analysis to find the pixel difference between the encrypted image 103 and the original image D3 described above; or (B) performing a multi-channel (e.g. RGB color space) scan of the original picture D3 with a decoding suite (e.g. StegSolve) to confirm whether there is a digital information totem D being written in concealing style at a lowest bit of a certain color in the encrypted image I; or (C) viewing the attribute information of the encrypted image 103 to confirm whether there is a string such as a key and/or a flag included in the encryption key totem D2 is embedded in the encrypted image 103. However, the above decoding procedure is only an example and is not limited thereto.

(2) Returning totem S22: The information device 102 transmits the time digital information totem D1 and the encryption key totem D2 to the management server 101, wherein the information device 102 can transmit the time digital information totem D1 and the encryption key totem D2 to the management server 101 through an internet network or a short distance transmission technology, but is not limited thereto;

(3) Verifying and comparing totem S23: After the management server 101 receives the time digital totem D1 and the encryption key totem D2, the processing module 1011 compares the verification database 1013 to verify whether the time digital information totem D1 and the encryption key totem D2 are correct. If the verification is passed, the processing module 1011 determines that the verification result is passed. On the contrary, the processing module 1011 determines that the verification result fails; wherein the processing module 1011 compares the service information or the digital time information when performing the comparison verification, for example, if the received time digital information totem D1 and the encryption key totem D2 cannot find corresponding service information or digital time information, it is determined that the verification does not pass.

(4) Responding service information S24: When the processing module 1011 determines that the verification result is valid, the processing module 1011 drives the service information database 1014 to search for a specified service information D4, and transmits the service information D4 to the information device 102. The information device 102 can execute the received service information D4.

Figure 7:
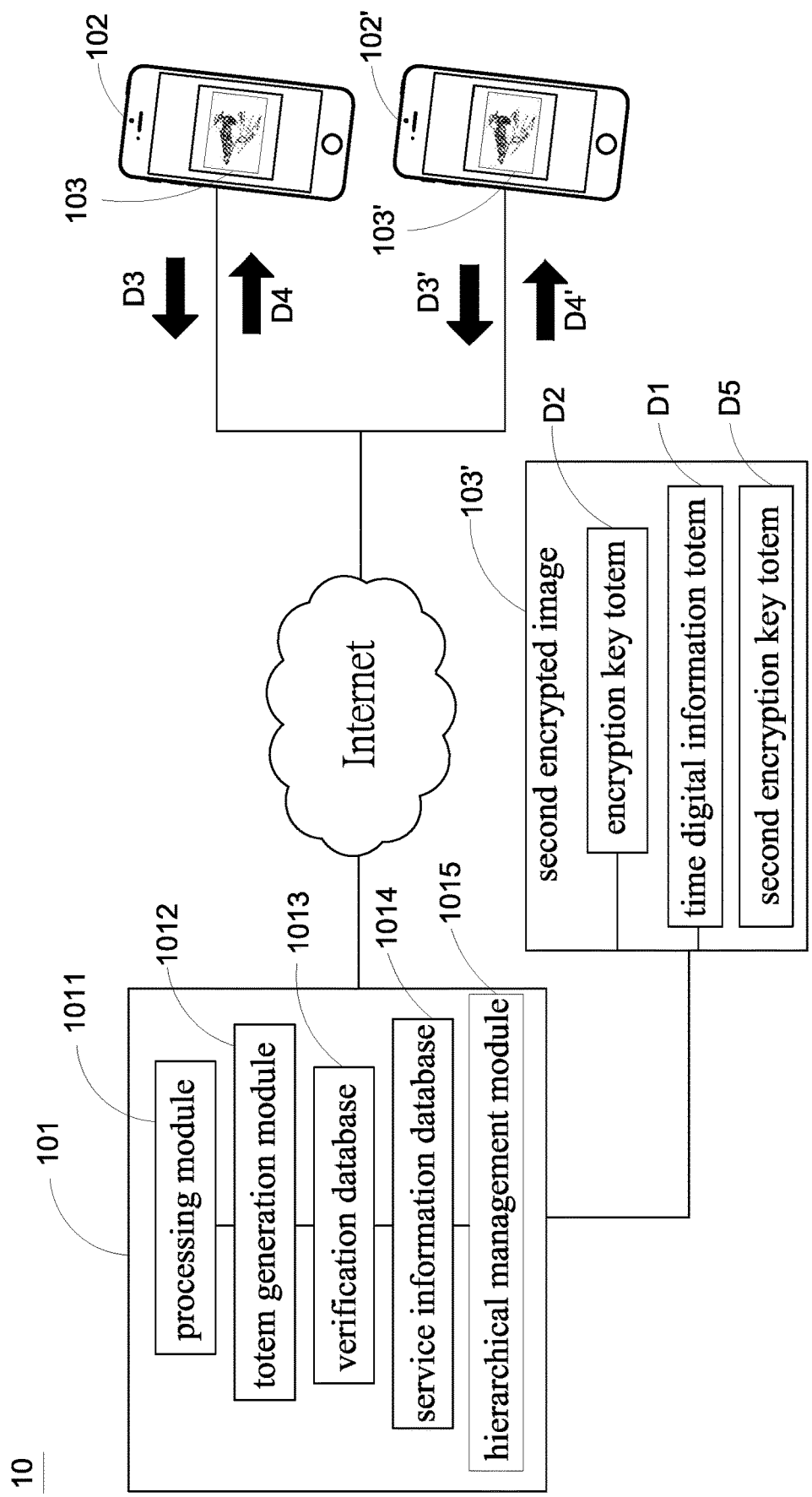
FIG. 7 is another embodiment (1) of the present disclosure.
Figure 8:
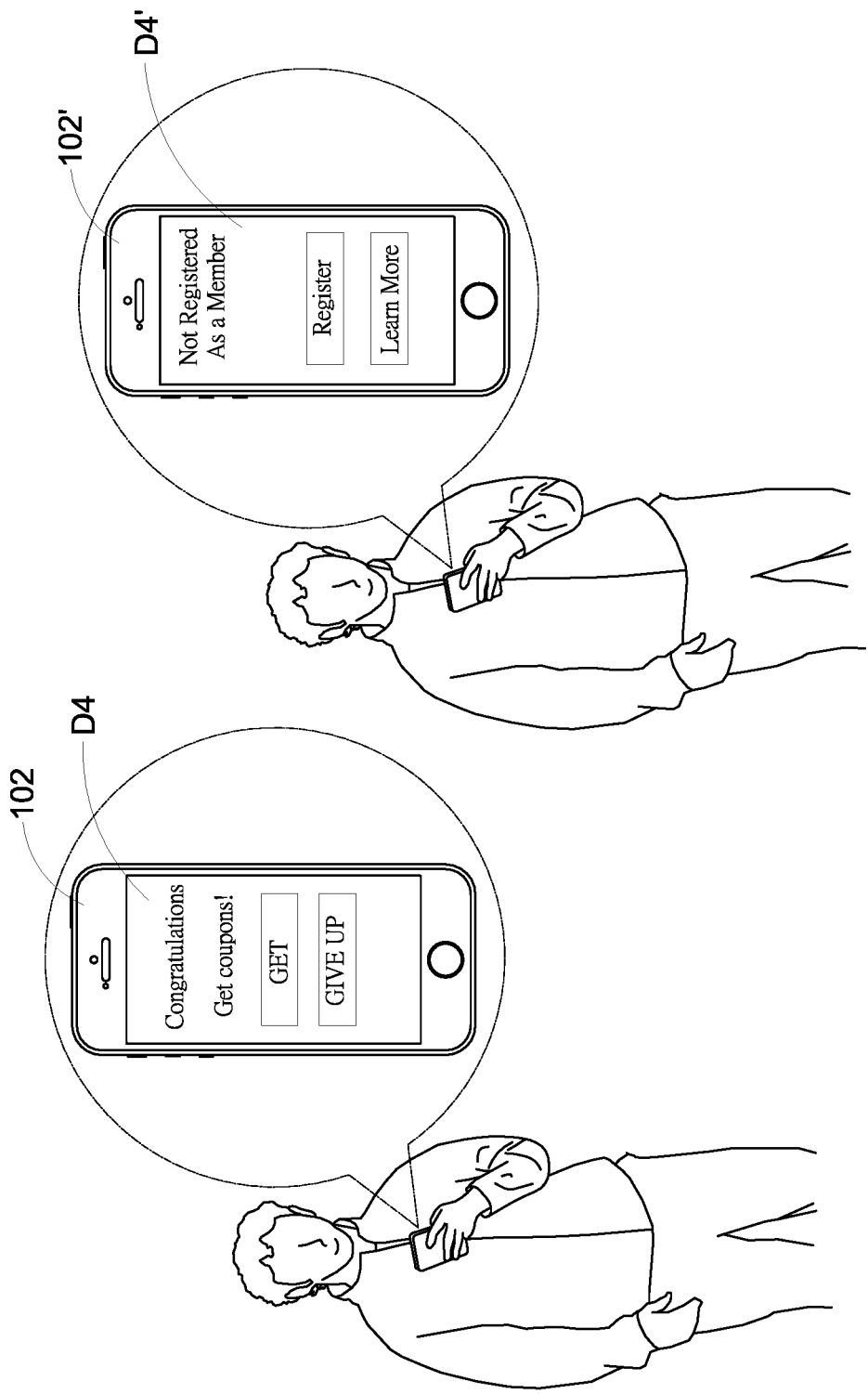
FIG. 8 is a schematic view (4) of the implementation of the present disclosure.

Referring to FIG. 7 and FIG. 8, the present disclosure can also formulate an encrypted image containing a personal exclusive picture, image, and totem (the encrypted image is composed of the original image, the time digital information totem, and the encryption key totem) so that encrypted images can be managed hierarchically based on individual identities, and specific service information is given based on each level. As shown in the figures, the management server 101 further includes a hierarchical management module 1015. The hierarchical management module 1015 is connected to the processing module 1011 for confirming the hierarchical information of the information device 102, wherein the hierarchical information is preloaded in the program execution module 1021. Moreover, the processing module 1011 of the management server 101 encodes a level access restriction into a second encryption key totem D5 based on an encoding rule, and synthetizes the time digital information totem D1, the encryption key totem D2, and the second encryption key totem D5 into a second encrypted image 103' with identification through the totem generation module 1012.

Furthermore, after a plurality of information devices (102, 102') scan the second encrypted image 103' to obtain the time digital information totem D1, the encryption key totem D2, and the second encryption key totem D5 respectively, each information device (102, 102') transmits the time digital information totem D1, the encryption key totem D2, and the second encryption key totem D5 to the management server 101 so that the hierarchical management module 1015 can confirm hierarchical information owned by each of the information devices (102, 102'), and match the corresponding service information (D4, D4') in the service information database 1014, and transmit the service information (D4, D4') back to each information device (102, 102').

Figure 9:
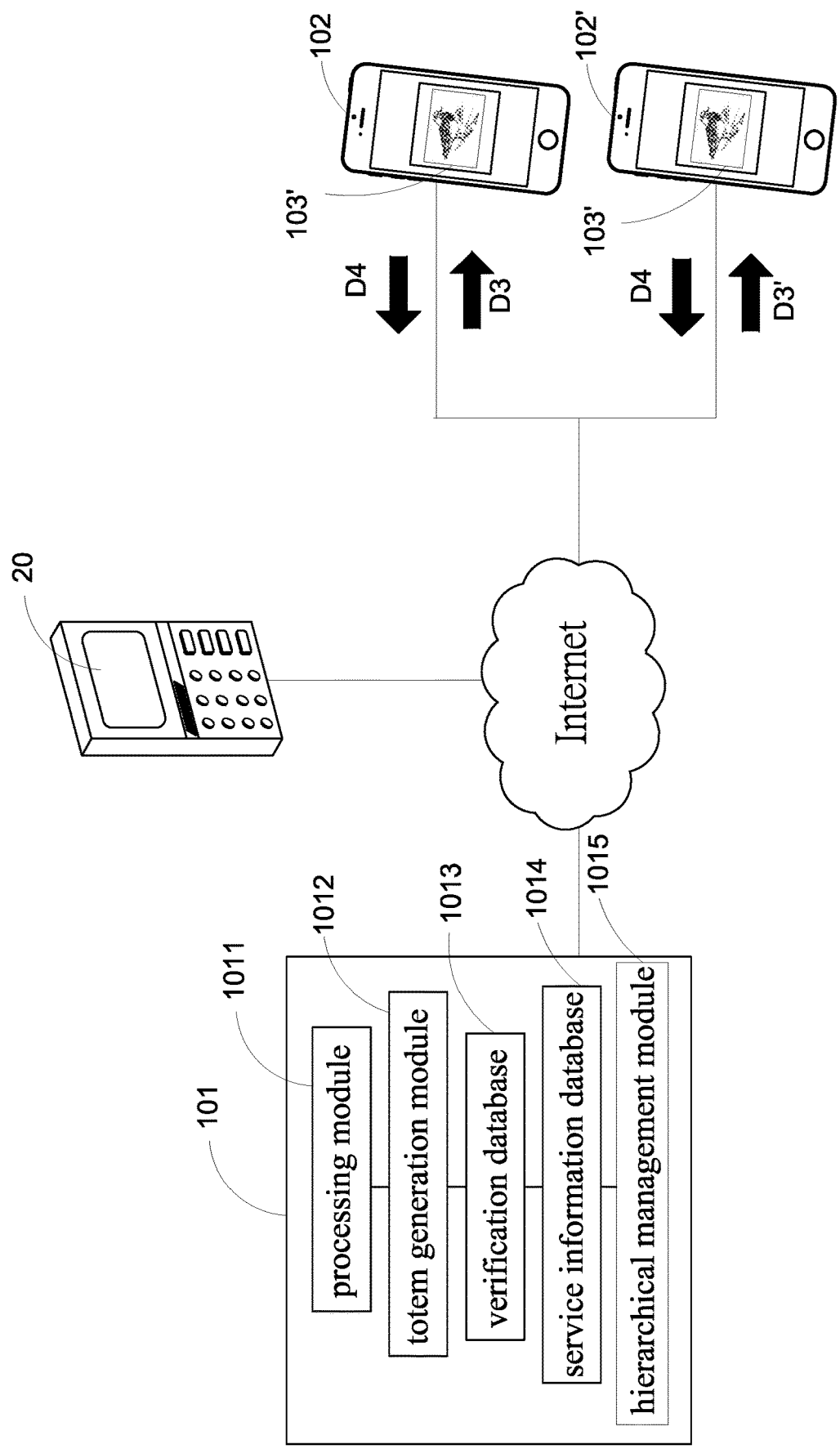
FIG. 9 is still another embodiment (2) of the present disclosure.
Figure 10:
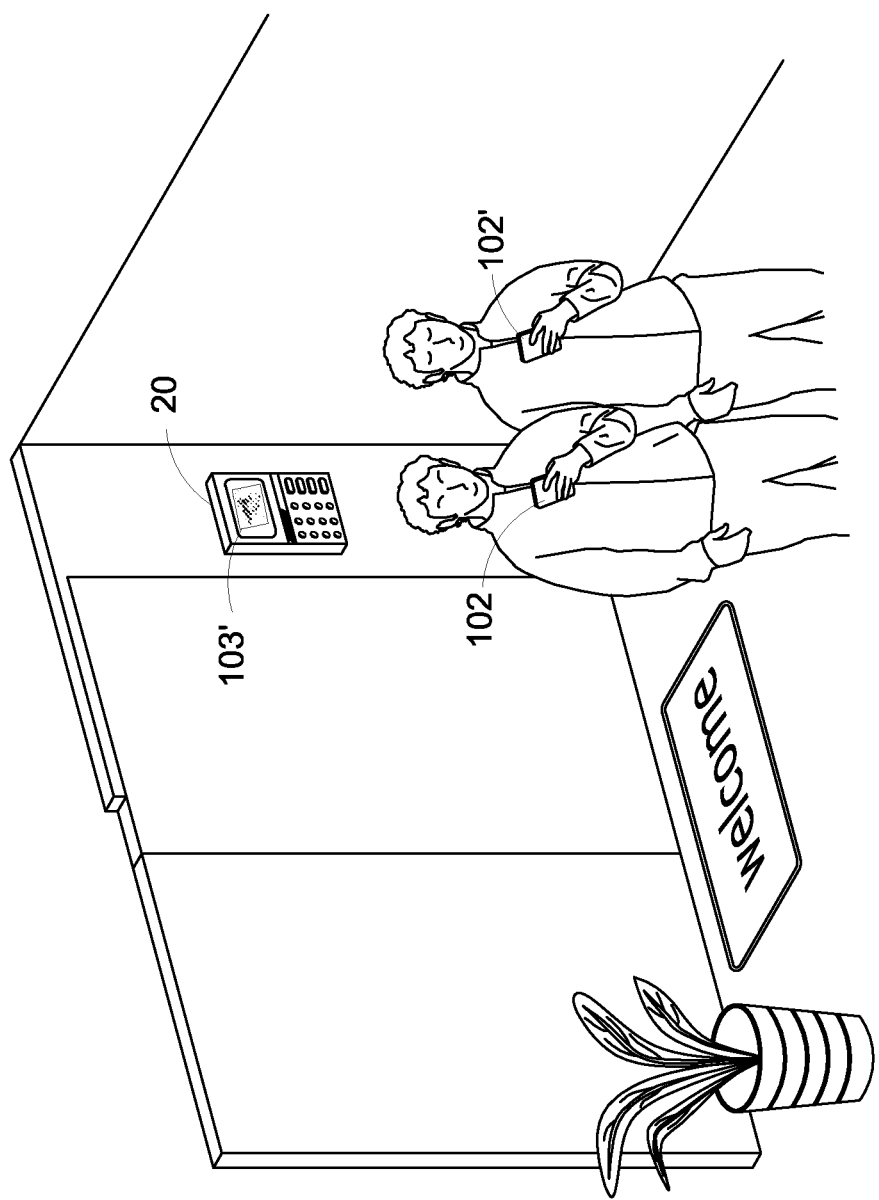
FIG. 10 is a schematic view (5) of the implementation of the present disclosure.

Referring to FIG. 9, the management server 101 is connected to an access control system 20. The access control system 20 connects to the management server 101, and the access control system 20 receives and displays the second encrypted image 103' transmitted from the management server 101. Referring again to FIG. 10, after the management server 101 transmits the second encrypted image 103' to the access control system 20, when the plurality of information devices (102, 102') want to release the access control, the access control system 20 can display the second encrypted image 103' for the plurality of information devices (102, 102') to scan the second encrypted image 103' respectively, and the time digital information totem D1, the encrypted key totem D2, and the second encryption key totem D5 are transmitted to the management server 101 so that the hierarchical management module 1015 can confirm the hierarchical information owned by each of the information device (102,102'), and match the corresponding service information in the service information database 1014 (D4, D4'), then the service information (D4, D4') is transmitted back to each information device (102, 102').

For example, if the hierarchical information of the information device 102 meets the conditions for releasing the access control, the hierarchical management module 1015 sends a de-regulation service information D4. Otherwise, if the hierarchical information of the information device 102' does not meet the conditions for releasing the access control, the hierarchical management module 1015 sends a service information D4' for maintaining access control. Therefore, because technology companies need to control commercial secrets, they usually use access control management methods to set management levels in various departments. For example, only R&D department personnel and general managers can enter R&D department. Accordingly, if the present disclosure is applied to the field of access control management, the technology company can set a dedicated encrypted image and send the encrypted image to relevant personnel to achieve strict access control, so that other personnel of non-relevant departments cannot easily copy the image.

In another preferred embodiment (3), the present disclosure can be applied to a personal service or a multi-person management service through an encrypted image including a time digital totem and an encryption key totem.

Taking personal service as an example (one-to-one use), when an individual user sets the service information to "Add an instant message list" and sets the original picture as "personal photo", after the individual user uploads the service information and the original picture to the management server, the management server returns an encrypted image with social function. In social occasion, user can present the encrypted image to other users for scanning, and other users can quickly scan with their device to add the user to the instant messaging buddy list. For example, after scanning by other users, the user can parse, for example, a URL Scheme command from the time digital totem or the encrypted key totem, thereby making other users' devices adds the user as a friend based on the URL Scheme instruction, wherein the link address structure of the instruction may include a service type name (<scheme>) and a host domain name (<host> or <host>:<port>), a resource path name (<path>), an instruction parameter name (<query>), or a custom combination of the above parameters.

In another preferred embodiment (4) of the present disclosure, multi-person management is taken as an example (one-to-many use), and an event organizer can set the service information to "acquire product coupon" and set the original picture as "activity logo". After the event organizer uploads the service information and the original image to the management server, the management server returns an encrypted image with commercial activity function, and when the event organizer releases the encrypted image, at least one consumer scans the encrypted image and the consumer can obtain the product coupon specified by the activity according to the above URL Scheme instruction. Since each encrypted image has a time digital totem and an encryption key totem, product coupon cannot be obtained even with a counterfeit image.

Based on foregoing, the present disclosure discloses an encrypted gallery management system and the implementation method thereof, comprising a management server and at least one information device. The present disclosure generates one or more sets of corresponding time digital information totem and an encryption key totem through a management server, wherein the time digital information totem is one of digital image, picture, totem, text data or a combination thereof, and the time digital information totem and the encryption key totem are synthetized into an encrypted image. After user scans the encrypted image, it is uploaded to the management server for comparison and verification. For example, if the verification is successful, the management server can respond a specific service information according to the time digital information totem and the encryption key totem. Accordingly, the present disclosure after implementation as above can achieve the purpose of providing an encrypted gallery management system and the implementation method thereof that can generate and manage restricted information access function.

While the present disclosure has been described by preferred embodiments in conjunction with accompanying drawings, it should be understood that the embodiments and the drawings are merely for descriptive and illustrative purpose, not intended for restriction of the scope of the present disclosure.

Equivalent variations and modifications performed by person skilled in the art without departing from the spirit and scope of the present disclosure should be considered to be still within the scope of the present disclosure.

What is claimed is:

1. An implementation method of an encrypted gallery management system, comprising:
   an encrypted image scanning step: after an information device scans an encrypted image, said information device analyzes said encrypted image to obtain a time digital information totem and an encryption key totem by applying a steganographic decoding algorithm, wherein, after a management server receives an original picture and a service information, a time digital information and an encryption key are generated according to an encoding rule, and said time digital information totem and said encryption key totem are generated after said time digital information is imaged, wherein, said time digital information comprises a digital time stamp when processing the encoding;
   a totem returning step: said information device transmits said time digital information totem and said encrypted key totem back to said management server;
   a totem verifying and comparing step: said management server compares and verifies whether said time digital information totem and said encryption key totem are correct, and determines a verification result, wherein said verification result is determined that the verification does not pass if said management server cannot find corresponding said service information or corresponding said digital time information;
   a service information responding step: when said verification result is passed, said management server transmits said service information to said information device for execution by said information device.

2. The implementation method of an encrypted gallery management system of claim 1, wherein said time digital information totem is generated by a program after a time digital information is executed, and the data type of said time digital information is one of a picture form, an image form, and a text form or a combination thereof.

3. The implementation method of an encrypted gallery management system of claim 1, wherein said management server synthesizes said time digital information totem, said encryption key totem, and a second encryption key totem into a second encrypted image with identification, wherein, said management server encodes a level access restriction into said second encryption key totem based on said encoding rule.

4. A method for generating an encrypted image of an encrypted gallery management system, comprising:
   an original picture setting step: after setting a service information and selecting an original picture, said service information and said original picture are transmitted to a management server;
   a totem generating step: after said management server receives said original picture and said service information, said management server generates a time digital information and an encryption key according to an encoding rule, and a time digital information totem and an encryption key totem are generated after said time digital information is imaged, wherein, said time digital information comprises a digital time stamp when processing the encoding;
   a totem storing step: said management server stores said time digital information totem and said encryption key totem;
   an encrypted image generating step: said management server synthesizes said time digital information totem and said encrypted key totem into said original picture by applying a steganographic algorithm, and generates an encrypted image after said synthesis is completed.

5. The method of generating an encrypted image of claim 4, wherein said service information and said original picture are transmitted to said management server through an information device.

6. An encrypted gallery management system, comprising:
   a management server having a processing module, further having a totem generation module, a verification database and a service information database connected to said processing module, said processing module being configured to generate a time digital information and an encryption key according to an encoding rule; said processing module is also configured to conduct image synthesis on a time digital information totem, an encryption key totem and an original picture by applying a steganographic algorithm, so that said time digital information totem and said encryption key totem is synthesized on the image pixels of said original picture, and an encrypted image is thus generated upon completion of the image synthesis, wherein, said time digital information comprises a digital time stamp when processing the encoding; said totem generation module is configured to convert said time digital information into said time digital information totem after said time digital information is imaged; said verification database is configured to store said encryption key totem and said time digital information totem; said service information database stores at least one service information;
   an information device having a program execution module connected to a scan module; said program execution module is configured to analyze said encrypted image so as to capture said encryption key totem and said time digital totem by applying a steganographic decoding algorithm, wherein said program execution module is also configured to execute said service information; said scanning module is configured to scan a picture of said encrypted image; and
   said information device transmits said encryption key totem and said time digital information totem obtained after scanning said encrypted image to said management server, and said management server compares and verifies whether said encryption key totem and said time digital information totem are correct, and determines a verification result; when said verification result is passed, said management server returns corresponding service information to said information device for execution, wherein said verification result is determined that the verification does not pass if said management server cannot find corresponding said service information or corresponding said digital time information.

7. The encrypted gallery management system of claim 6, wherein a hierarchical management module is connected to said processing module, and said hierarchical management module is configured to confirm a hierarchical information of said information device.

8. The encrypted gallery management system of claim 6, wherein said totem generation module generates a second encrypted image with said time digital information totem, said encryption key totem, and a second encryption key totem.

9. The encrypted gallery management system of claim 8, wherein said management server is connected to an access control system, said access control system is configured to display said second encrypted image for scanning by said information device.

10. The encrypted gallery management system of claim 8, wherein said verification database is applied to a blockchain network which is configured to store said encryption key therein.

* * * * *